(12) United States Patent
Pugh et al.

(10) Patent No.: US 6,662,074 B2
(45) Date of Patent: *Dec. 9, 2003

(54) SYSTEM FOR ADAPTING AN AUTOMATIC SCREW MACHINE TO ACHIEVE COMPUTER NUMERIC CONTROL

(75) Inventors: Dennis R. Pugh, Galena, OH (US);
William Blair Shook, Tampa, FL (US);
Thomas M. Walliser, Columbus, OH (US); Vincent J. Vohnout, Columbus, OH (US)

(73) Assignee: AMT Machines Systems Ltd., Columbus, OH (US)

(*) Notice: Subject to any disclaimer, the term of this patent is extended or adjusted under 35 U.S.C. 154(b) by 144 days.

This patent is subject to a terminal disclaimer.

(21) Appl. No.: 09/768,797

(22) Filed: Jan. 24, 2001

(65) Prior Publication Data

US 2001/0018624 A1 Aug. 30, 2001

Related U.S. Application Data

(63) Continuation of application No. 09/064,417, filed on Apr. 22, 1998, now Pat. No. 6,205,372, which is a continuation of application No. 08/494,154, filed on Jun. 23, 1995, now Pat. No. 5,808,853, which is a continuation of application No. 08/098,959, filed on Jul. 28, 1993, now abandoned.

(51) Int. Cl.$^7$ .............................................. G06F 19/00

(52) U.S. Cl. ..................... 700/192; 700/193; 700/170; 700/187

(58) Field of Search ................................ 700/193, 192, 700/170, 187, 189

(56) References Cited

U.S. PATENT DOCUMENTS

| | | | | |
|---|---|---|---|---|
| 2,832,023 A | | 4/1958 | Gough | 318/162 |
| 2,843,811 A | | 7/1958 | Tripp | 318/19 |
| 2,867,759 A | | 1/1959 | Comstock | 318/29 |
| 3,570,333 A | | 3/1971 | Beechler | 82/30 |
| 3,592,090 A | | 7/1971 | Koopman | 82/30 |
| 3,626,792 A | * | 12/1971 | Eichenhofer | 82/153 |
| 3,699,317 A | * | 10/1972 | Middleditch | 700/187 |
| 3,720,120 A | | 3/1973 | Cutler | 82/2 B |
| 3,727,493 A | | 4/1973 | Lahm | 82/1 C |

(List continued on next page.)

*Primary Examiner*—Leo Picard
*Assistant Examiner*—Michael D. Masinick

(57) ABSTRACT

A system for adapting existing conventional screw machines to be capable of computer numerical control operation. The system incorporates the use of a VersaCam device which replaces the turret cam of a single spindle screw machine. The VersaCam system monitors the motion of the screw machine camshaft and actuates the turret slide in synchronization with the camshaft. The VersaCam system also provides a means of specifying the desired turret slide trajectory for any given job.

24 Claims, 4 Drawing Sheets

U.S. PATENT DOCUMENTS

| | | | |
|---|---|---|---|
| 3,878,742 A | | 4/1975 | Lahm ........................ 82/1 C |
| 3,882,304 A | * | 5/1975 | Walters ...................... 700/163 |
| 3,916,739 A | * | 11/1975 | Nomura ........................ 82/158 |
| 4,057,893 A | | 11/1977 | Smith et al. ................... 29/560 |
| 4,080,853 A | | 3/1978 | Goto ............................ 82/2 R |
| 4,096,770 A | | 6/1978 | Tanner ......................... 82/1 C |
| 4,208,930 A | | 6/1980 | Hermann .................... 82/28 A |
| 4,255,991 A | * | 3/1981 | Lambert ...................... 82/1.11 |
| 4,304,159 A | | 12/1981 | Tsuchiya ...................... 82/2.5 |
| 4,386,407 A | | 5/1983 | Hungerford ................. 364/474 |
| 4,400,781 A | | 8/1983 | Hotta et al. ................. 364/474 |
| 4,479,292 A | * | 10/1984 | Wheeler ........................ 29/56 |
| 4,484,413 A | | 11/1984 | Yamamoto et al. ....... 51/165.71 |
| 4,629,955 A | | 12/1986 | French et al. ............... 318/625 |
| 4,635,340 A | | 1/1987 | Link ........................... 29/558 |
| 4,653,360 A | | 3/1987 | Compton ........................ 82/18 |
| 4,656,897 A | | 4/1987 | von Niederhausern et al. ........................... 82/2 B |
| 4,805,497 A | | 2/1989 | Dunham ..................... 82/36 A |
| 4,817,007 A | | 3/1989 | New ...................... 364/474.01 |
| 4,831,906 A | | 5/1989 | Sugimoto et al. ............. 82/118 |
| 4,942,650 A | | 7/1990 | Howarth ........................ 29/38 |
| 4,992,711 A | | 2/1991 | Sugita et al. ................ 318/561 |
| 5,050,468 A | | 9/1991 | Nydigger ..................... 82/1.11 |
| 5,053,758 A | * | 10/1991 | Cornett et al. .............. 345/174 |
| 5,105,925 A | * | 4/1992 | Tremaglio et al. ........ 192/224.1 |
| 5,181,442 A | | 1/1993 | Nezu ............................ 82/19 |
| 5,797,180 A | | 8/1998 | Buchholz ................... 29/888.1 |
| 5,808,893 A | | 9/1998 | Pugh et al. ............. 364/474.35 |
| 6,205,372 B1 | * | 3/2001 | Pugh et al. ................. 700/193 |

* cited by examiner

SYSTEM FOR ADAPTING AN AUTOMATIC SCREW MACHINE TO ACHIEVE COMPUTER NUMERIC CONTROL

This a continuation of U.S. patent application Ser. No. 09/064,417, filed Apr. 22, 1998, now U.S. Pat. No. 6,205,372, which is a continuation of U.S. patent application Ser. No. 08/494,154, filed Jun. 23, 1995, now U.S. Pat. No. 5,808,893. U.S. patent application Ser. No. 08/494,154 is a continuation of U.S. patent application Ser. No. 08/098,959, filed Jul. 28, 1993, now abandoned.

BACKGROUND AND SUMMARY OF THE INVENTION

The present invention relates generally to automatic screw machines, and more particularly, to a system for adapting screw machines into computer numeric control ("CNC") operated machines by incorporating a unique VersaCam device in place of a conventional hard cam.

Conventional automatic screw machines have been known for some time. These machines have a high capability for producing a large number of identical parts. When small quantities are required, however, the time and expense to produce the special control cams necessary for operation of the machine, makes the use of a conventional automatic screw machine less desirable.

One of the operational functions of the screw machine is the movement of the machine tool relative to the work piece, which is generally accomplished by longitudinal movement of a tool turret and lateral movement of two or more cross slides. At least two cross slides are usually provided on a conventional screw machine. The cross slides typically move lateral to the spindle of the machine. Other cross slides may be positioned at specified angles relative to the basic cross slides.

Other functions important to the machine include the indexing of the tool turret, the feedout of the stock, and the control of the spindle speeds. In conventional, single-spindle automatic screw machines, the timed sequence of the above functions is controlled mechanically through cams, trip dogs, trip levers and cam followers, which result in the engagement of the conventional machine mechanisms through clutches, gears, and similar devices at the proper time. Such an arrangement of mechanical devices is found in any conventional automatic screw machine.

A cam made for one job can often be used on other jobs, although any change in machine speed or feed rate in any part of the sequence will result in slowing down the entire job. The alternative is to make a complete new set of cams specifically designed for the new job. For these and other known reasons it is desirable that some or all of the operations of the automatic screw machine be controlled by a numeric control system. With a numerical control system, the machine functions can be controlled through electrical signals by a software program, and the requirements of each job can be programmed into the apparatus. There are newly made automatic screw machines which have this numerical control capability. However, there are a vast number of existing automatic screw machines of the conventional variety which do not have this capability. Therefore, a system for retrofitting these conventional machines is needed.

Accordingly, a system for retrofitting a conventional automatic screw machine to accept numerical control is provided by the present invention. The present invention may also be incorporated into newly manufactured screw machines that do not have CNC capability. A conventional automatic screw machine includes a plurality of mechanical timing means which operate through engaging means, such as clutches and gears, to connect a main driving means to various operating mechanisms of the machine. These mechanisms control the individual functions of the machine, for example, spindle speed, the indexing of the tool turret and the feeding of stock through the spindle. Also, the movement of the turret slide, towards and away from the work piece, and the movement of the cross slides are controlled through cam means usually including a cam and a camshaft, which are driven by drive shaft means which in turn is driven by the main driving means.

The VersaCam system of the present invention is a versatile replacement for the turret cam of a single-spindle screw machine. The VersaCam can drive the cam follower so as to mimic any possible cam profile. The VersaCam is a CNC machine with a mechanical output that displaces the cam follower of a cam-logic machine. It comprises a mechanism to drive a cam follower, an actuator to power this mechanism, a sensor to determine the position of the mechanism, a control system which causes the mechanism to follow a desired trajectory (as a function of cam drive shaft position), a means for specifying desired trajectory, and a sensor to determine the position of the cam drive shaft.

The VersaCam system of the present invention is not designed to replace the mechanical timing of conventional machines but rather will use and work with the mechanical timing found in conventional machines. Further, the VersaCam system does not require disconnecting the cross slides, but uses them as they are normally used in the operation of conventional machines. The VersaCam system depends on the position of the driving camshaft for its operation. The VersaCam system uses an electric drive and is designed to drive the turret without modification to the turret.

In another embodiment of the present invention the screw machine turret slide may be actuated directly, rather than through the cam follower. A linear actuator may be provided, in direct contact with the turret slide, which actuator may be hydraulic, ball-screw based, or of other common hardware.

In addition to the novel features and advantages mentioned above, other objects and advantages of the present invention will be readily apparent from the following descriptions of the drawings and preferred embodiments.

DETAILED DESCRIPTION OF PREFERRED EMBODIMENT(S)

Figure 1:
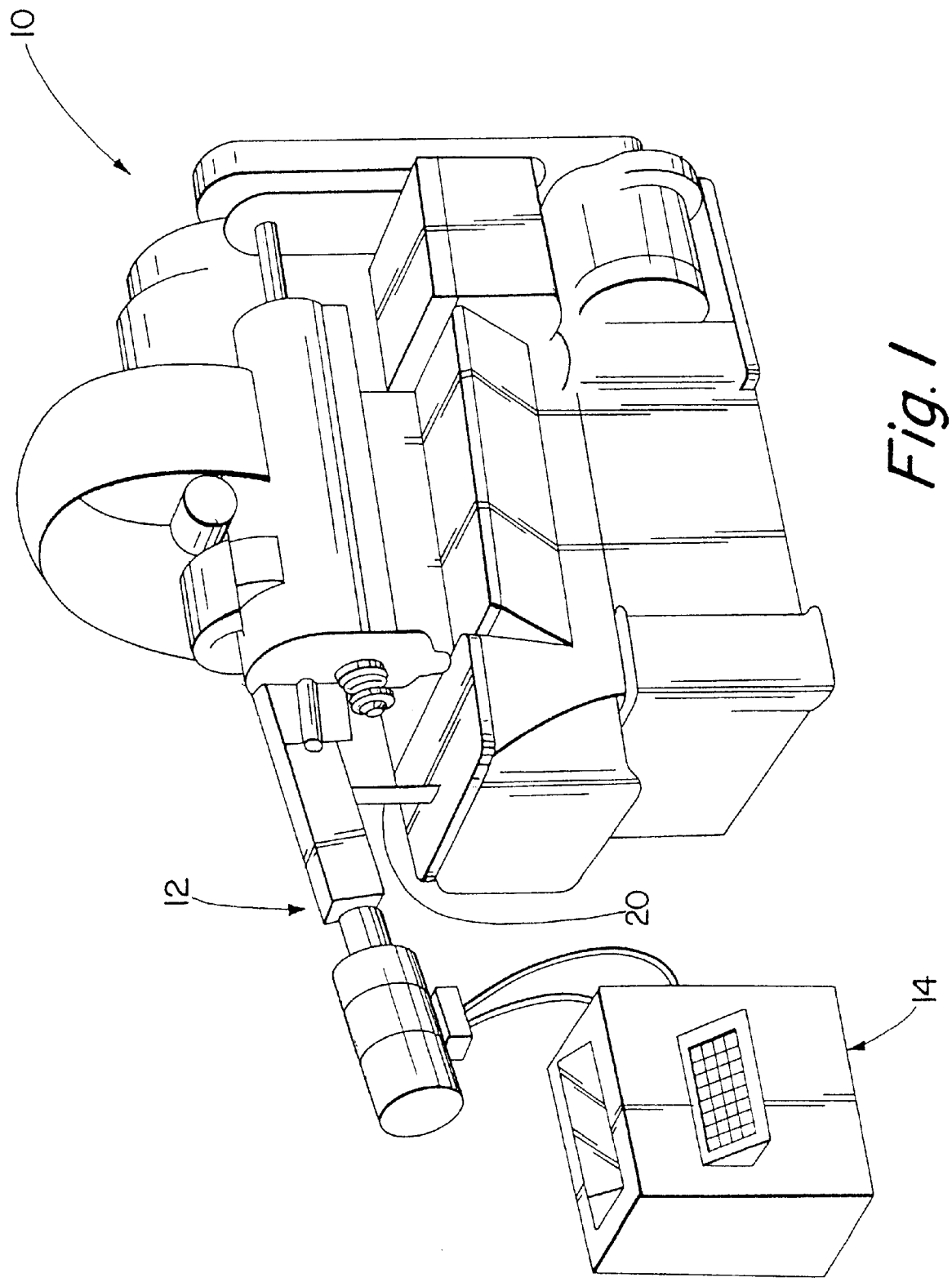
FIG. 1 is a perspective view of a conventional screw machine retrofitted with a preferred embodiment of the present invention.

Referring now to the drawings, and particularly FIG. 1, there is shown generally at reference numeral 10 a single-spindle automatic screw machine. The machine 10 is shown in a retrofitted condition, by the present invention, to be operable as a computer numeric control machine. The present invention has been termed a VersaCam and is identified by reference numeral 12.

Figure 4:
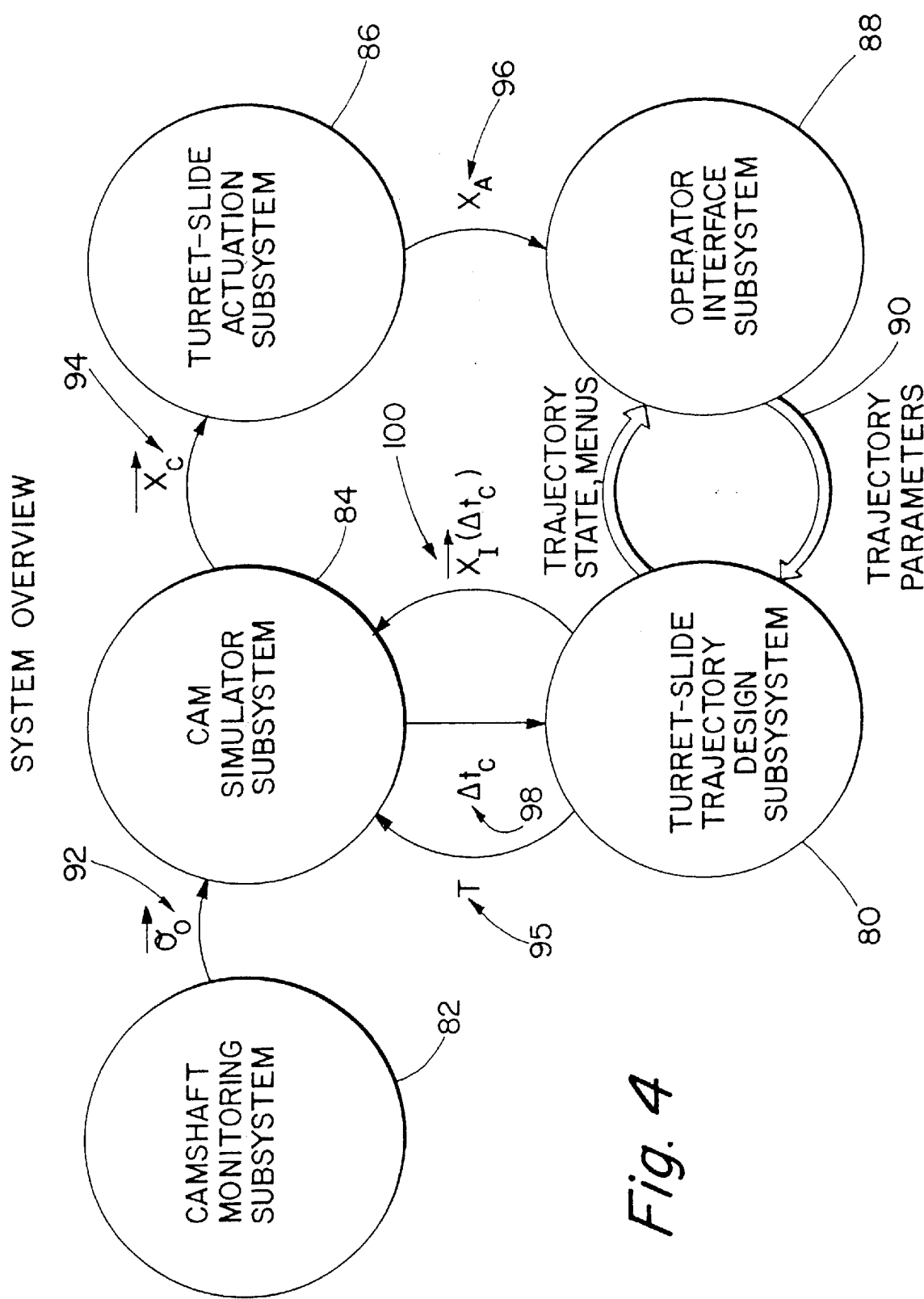
FIG. 4 is a diagram of a preferred embodiment of a software system which may be used in connection with a preferred embodiment of the present invention.

The VersaCam 12 is actually an electromechanical system with several functional subsystems as shown in FIG. 4. Also shown in FIG. 1, and described in greater detail hereinafter, is the operator interface unit 14 of the present invention.

Figure 2:
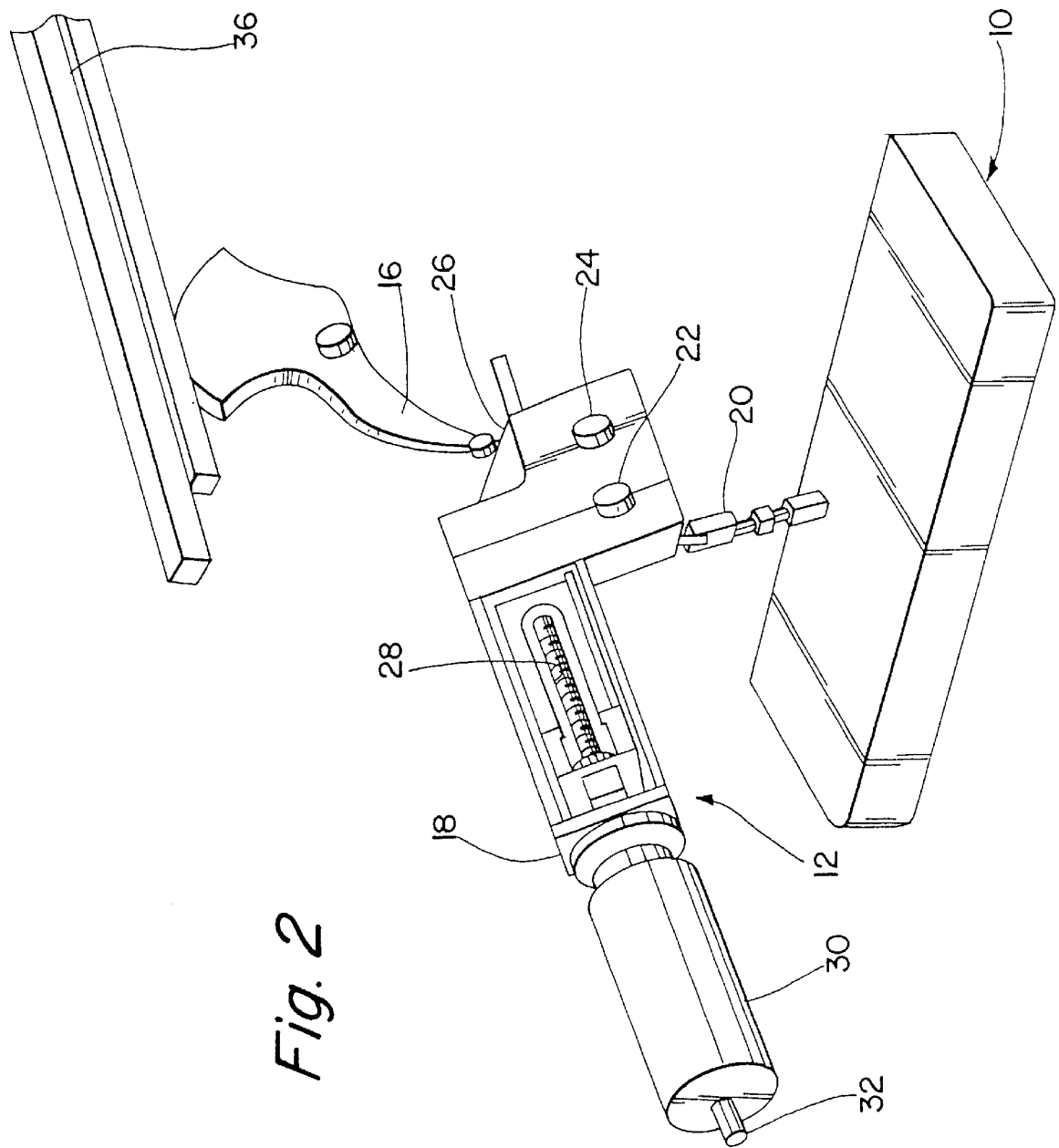
FIG. 2 is a perspective view of a preferred embodiment of a VersaCam device of the present invention.

Referring now to FIG. 2, an enlarged partial perspective view is shown of the VersaCam 12 in association with cam follower 16 of a machine 10.

The VersaCam system of the present invention may be packaged in a single housing 18, which mounts to the cam drive shaft (in place of the hard cam) via rotary bearings. An adjustable restraining link 20 may position the housing in the desired orientation. The sensor 22 which measures the cam drive shaft 24 position may be a rotary optical incremental encoder, mounted to the VersaCam housing, and gear driven from the cam drive shaft. The mechanism which drives the cam follower 16 may be a linear wedge 26 (the cam wedge) which is moved inward and outward by means of a ball-screw 28. The bottom of the cam wedge may ride on rollers. The actuator 30 may be a conventional DC electric servo-motor with a pulse-width-modulated servo-amplifier. The sensor 32 which determines the position of the mechanism may be a rotary optical incremental encoder which is mounted to the back side of the servo-motor. In addition there may be a mechanical limit switch which is tripped when the cam wedge is in a certain position. This switch may be used to determine the revolution number of the optical encoder. The control system may be implemented on a microcontroller, microprocessor, and/or digital signal processor chip, depending on computability speed requirements. The desired trajectory profile and other parameters may be stored in local memory. The controller may incorporate a small keypad and an alpha-numeric display.

Desired trajectories may be specified by means of a software package which preferably runs on personal computers. The operator may specify, in tabular format, the operations, positions, etc. for each tool in sequence. The software may then calculate the detailed trajectory necessary to implement the operations. The trajectory parameters may be downloaded into the VersaCam controller via a serial communications port.

Figure 3:
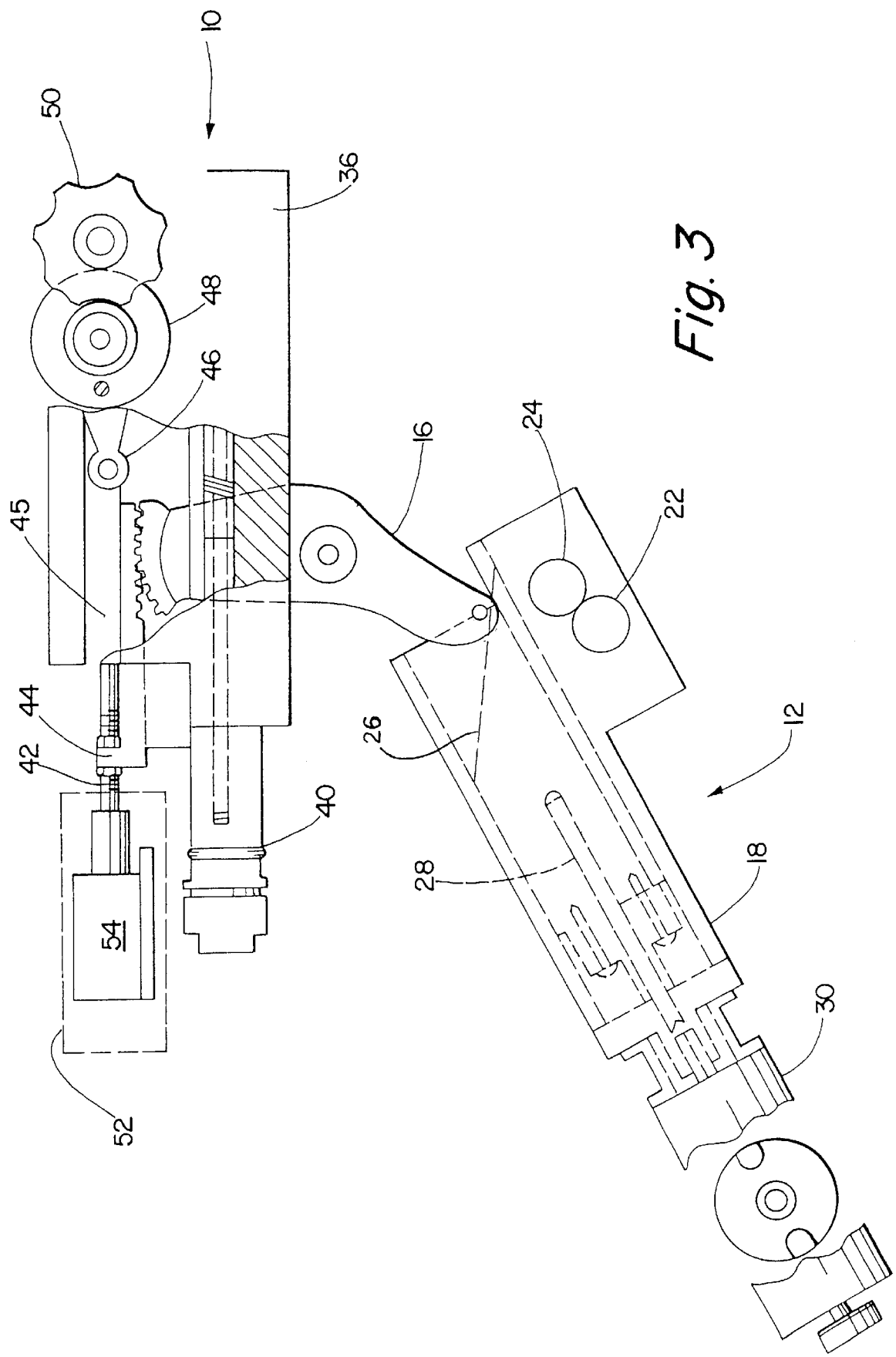
FIG. 3 is a cutaway view of a preferred embodiment of a VersaCam device of the present invention shown in connection with existing hardware of a conventional automatic screw machine.

FIG. 3 illustrates in greater detail the physical mechanism of the conventional machine 10 and the VersaCam 12. Components shown in FIG. 3 which are typically common to a conventional machine are a turret slide cushion 40, an adjusting screw 42 connected to the turret slide and a turret slide rack 44 which engages the teeth of the cam follower 16. A connecting rod 46, roll disk 48, and turret disk 50 are known to those of ordinary skill in the art.

In the boxed, dashed zone 52 of FIG. 3 another embodiment of the present invention is shown. The boxed zone depicts a direct linear drive unit 54 which may be used in place of the wedge drive unit 12. These two units 54, 12 would not be used together but as alternatives to each other. The linear actuator 54 could be hydraulic, ball-screw based, or other similar configuration.

The slider block, and the gear rack 44, to which the adjusting screw 42 is attached can slide with respect to the main turret slide 36. When used normally, the load path is as follows:

the cam applies force to the lead lever 16;
the lead lever 16 applies force to the turret slide (gear) rack 44;
the gear rack applies force to the adjusting screw 42;
the adjusting screw applies force to the slider block 45;
the slider block applies force to the connecting rod 46;
the connecting rod applies force to the turret change roll disk 48; and
the turret change roll disk applies force to the turret slide 36. When the tool turret is indexed, the turret change roll disk rotates through one full revolution, and the connecting rod causes the relative position between the slider block and the turret slide to change. If the turret slide is fully retracted, this results in the cam follower lifting off of the cam. If the turret slide is not retracted, the cam follower will stay on the cam and the turret slide will retract.

There are two approaches to using direct linear actuation. In the first of these, the linear actuator may push, but not be attached to, the slider block (via the adjusting screw in the drawing). This permits the mechanical tool-change retract mechanism to be used normally. The linear actuator cannot be attached to the slider block because, when the turret slide is fully retracted, the retract mechanism would fight the linear actuator, trying to pull it. The disadvantage of this approach is that the linear actuator, if based on a ball-screw, would require its own linear guideway system to support the ball-screw.

The second approach is to disable the mechanical retract mechanism and to use the servomotor to retract the turret slide during tool changes. The linear actuator could then be attached directly to any point on the turret slide, and the turret slide guideway would also serve as the guideway for a ball-screw. This approach has two disadvantages. First, a reasonably-sized servomotor would be slower than the retract mechanism, therefore increasing part cycle times. (This apparently is a drawback of some retrofit systems currently on the market.) Second, the actual indexing of the tool turret would still be accomplished mechanically, and the relative timing between the mechanical (trip-dog) actuation and the software turret retractions would be critical.

In order to achieve the functionality of a turret cam, the VersaCam system must monitor the motion of the screw-machine camshaft 24, and it must actuate the turret slide 36 in precise synchronization with the camshaft. In addition, since it is intended to replace all turret cams, the VersaCam system must provide a means of specifying the desired turret slide trajectory for any given job.

The VersaCam system has many subsystems. In this document, a distinction is drawn between functional subsystems and physical subsystems. A functional subsystem is defined by its inputs, outputs, and the relationship between them. A physical subsystem is the particular hardware and software chosen to implement a functional subsystem(s). The functional subsystems and their interrelationships are of primary importance.

There are many possible variations of physical subsystems which could be employed to produce the functionality of the VersaCam system. Furthermore, the physical subsystems of the VersaCam system do not necessarily correspond directly to its functional subsystems. Functional subsystems may share physical subsystems. As an example of a shared physical subsystem, software components of all of the functional subsystems may execute on the same microprocessor within the VersaCam controller. A less-obvious example is the attachment of the VersaCam mechanism to the camshaft: it provides a load path for the mechanism of the Turret Slide Actuation Subsystem, and, it provides a drive means for the position sensor of the Camshaft Monitoring Subsystem.

As shown in FIG. 4, the VersaCam system may include the following five major functional subsystems:

Turret Slide Trajectory Design Subsystem 80;
Camshaft Monitoring Subsystem 82;
Cam Simulator Subsystem 84;
Turret Slide Actuation Subsystem 86; and
Operator Interface Subsystem 88.

The Turret Slide Trajectory Design Subsystem 80 generates a time-based turret slide trajectory on the basis of operator input 90.

The Camshaft Monitoring Subsystem 82 provides camshaft state 92 (position, velocity, and acceleration) to the Cam Simulator Subsystem.

The Cam Simulator Subsystem 84 generates commanded turret slide states 94 (position, velocity, and acceleration) in real time, based upon the nominal time-based trajectory and upon the actual camshaft state 92 (position, velocity, and acceleration). It causes the turret slide to maintain precise synchronization with the camshaft-driven mechanisms, regardless of perturbations in camshaft velocity.

The Turret Slide Actuation Subsystem 86 causes the turret slide to physically track its commanded state (position, velocity, and acceleration). The Operator Interface Subsystem 88 provides the operator with the appropriate control of, and feedback from, all subsystems of the VersaCam system. All of the above functional subsystems are described in detail hereinafter.

The Turret Slide Trajectory Design Subsystem 80 is a software system which inputs high-level, operator-specified parameters 90 and produces a complete set of detailed trajectory parameters which describe the desired motion of the screw machine turret slide as a function of time. All time parameters are relative to the start of a machine cycle 95, and assume a constant machine cycle time (which implies a constant camshaft rotational velocity).

The portion of the Turret Slide Trajectory Design Subsystem which permits the screw machine operator to make precise tool offset adjustments executes on the VersaCam controller. The remainder of Trajectory Design Subsystem may also execute on the VersaCam controller. Alternatively, or in addition, it may execute on a stand-alone computer such as an IBM PC. If the complete Trajectory Design Subsystem does not execute on the VersaCam controller, the computed trajectory parameters may be computed on a stand-alone computer and be transferred to the VersaCam controller prior to using the trajectory. If the software can execute on both platforms, then it is also possible to specify parameters on both platforms, either fully or partially.

The generation of optimal trajectories for the VersaCam is manageable if tool motion is first considered independently of machine timing. In general, tool motion requirements are a function of the particular tool, the piece being fabricated, the stock being used, and the spindle speed. Machine timing should be designed for compatibility with the tool motion, not vice versa. Thus when a tool is cutting metal, or is not clear of the metal, the required tool motion dictates what the other mechanisms must or must not do. On the other hand, when the tool is clear of the workpiece, the other mechanisms may have priority (in which case the turret must simply stay clear of the action).

A screw machine turret, cam, and tool holders have so many possible adjustments (degrees of freedom) that use of the machine (and the VersaCam in particular) will be greatly facilitated if some conventions are adopted about how the redundant adjustments should be employed. The following suggested conventions are believed to be consistent with standard screw machine practice, to be essentially optimal with respect to cycle time, and to provide a reasonably intuitive mapping between part geometry and machine setup.

In a departure from normal robot (and CNC machine tool) conventions, consider each tool to be independent (no explicit common tool or workpiece coordinate system). Let each tool's maximum penetration into the stock occur at the same (maximum) turret slide position, unless turret slide travel is explicitly "cut down" for a given tool by the setup man. ("Cut down" would be used for tools which are unusually long.)

The above approach has the following implications:

1. The "Stop" will be the shortest tool (and it implicitly establishes the workpiece datum, which is the "stopped" surface of the stock). Any tool shorter than the stop could not reach the stock, much less cut it.
2. The length (radius installed in the tool turret) of any other tool, minus the length of the "stop", determines that tool's maximum penetration into the stock. (This should be both intuitive and familiar to setup men.)
3. The VersaCam system does not need to know anything explicit about the workpiece dimensions (other that the depth of individual cuts), because they are determined by tool length adjustments (both mechanical and software) alone.
4. The maximum excursion position of the turret can be established via software at run-time, because the VersaCam kinematics are embedded in the controller anyway. In general, however, the VersaCam wedge will be fully extended at the maximum excursion position; this is equivalent to the lobes of a hard cam extending to the maximum radius of the cam (which is the normal practice). The mechanical turret slide offset adjustment can be used exactly as it is with a hard cam. Turret slide offset adjustments (mechanical and/or software) would normally be used to adjust the workpiece reference surface (that surface which hits the stop) relative to tools mounted to cross-slides (such as the cut-off tool).
5. The turret slide excursions are minimized (and cycle time optimized), because there is no turret slide motion required to compensate for unmatched tool lengths.

The following general approach may be used to generate optimal cycles:

1. Fully specify all metal cutting operations of the turret tools, the associated turn-around operations, and any other required turret slide motions. The computer can determine the total amount of time required for such actions.
2. Specify tool changes as necessary between cutting actions. These can, in general, overlap turn-around operations. The computer can determine the time (if any) which must be added to the turn-around operations in order to allow for the tool change to complete.
3. Estimate the elapsed times required for independent cross-slide motions (i.e. ones which cannot be performed simultaneously with turret tool cutting actions). These should be programmed as explicit dwells or as minimum turn-around durations (as described above for tool changes) in the turret slide trajectory.
4. Select a machine cycle time which is slightly greater than the sum of all the above elapsed times.
5. Select cross-slide cams. Determine how many hundredths of motion are needed for each independent cross-slide operation. If necessary, adjust the corresponding dwell times or turn-around durations in the turret slide trajectory.

6. There will be, in general, some "slack" time (when the screw machine is doing nothing) at the beginning/end of the turret slide trajectory cycle. This is unavoidable, inasmuch as the available cycle times are discrete quantities, and the first one slower than the optimal time is the fastest cycle time that can be used. It is also desirable to have some amount of slack time, however, because it provides a safety margin for mix-estimation of cross-slide operation times, and permits the set-up man some flexibility in the installation of side-cams, etc.

The computer now has all the information necessary to compute optimal turret trajectories. The setup man now simply installs side cams, trip dogs, etc., at the appropriate positions in order to complete the machine setup.

As an alternative to the foregoing setup procedure for optimal cycles, the setup man can install the side cams, etc., where he sees fit, although he obviously cannot install them arbitrarily. In general, all he really has the freedom to do is to install them at a "later" position on the camshaft than is really necessary. Then, he can adjust turn-around durations and dwell times such that the computer agrees with his placement of the side cams, etc. The computer can then compute the entire (sub-optimal) turret slide trajectory. If the set-up man has used up more than the available amount of slack time, however, he will have to change his mechanical setup or else use a slower cycle time.

A complete turret slide trajectory is made up of multiple motion "segments" which together span an entire machine cycle. The boundary conditions of each segment are constrained such that the turret slide position and velocity are continuous (no step changes) over the entire trajectory. Note that a complete turret slide trajectory is cyclic, thus the "first" segment is actually the successor of the "last" segment, and the constraints on segment boundary conditions apply to this pair of segments also.

We have chosen to represent a trajectory segment by the coefficients of the polynomial X=P(t), where X 96 represents turret position and t 98 represents the elapsed time since the start of the machine cycle, and by the initial and final values of time for the segment. The final value of time for a given segment is equivalent to the initial value of time for the following segment. Equations for turret velocity and acceleration are obtained by differentiating the polynomial which describes each segment.

Second-order polynomials may be used to represent trajectory segments; this represents a good tradeoff between complexity, smoothness, and overall performance. Thus the turret slide acceleration is constant for the duration of a given segment. However, if it were desired to reduce the trajectory "jerk" (rate of change of acceleration), this could be accomplished by fitting a higher order polynomial to each trajectory segment while imposing the additional boundary value condition that acceleration be continuous across segment boundaries. Even trajectory "jounce" (rate of change of jerk) can be limited in this manner, if desired.

An "operation" specifies a set of one or more trajectory segments. Given the set of operator-input parameters for a given operation, software algorithms automatically compute all of the segment parameters for the segments within that operation.

Five types of operations are: Feed-In, Dwell, Feed-Out, Turn-Around, and Position. Note that the above operations cannot be used in an arbitrary sequence. Some of the operations fully or partially specify their own boundary conditions, and some inherit some or all of their boundary conditions from adjacent operations. The boundary condition constraints are satisfied when the operations are used in their customary and intended sequences; otherwise, the system signals the operator that the trajectory is "incomplete."

The Feed-In operation is used for normal cutting operations in which the turret tooling is advancing into the feedstock. The Feed-In operation preferably uses the following operator-specified parameters:

Initial position (millimeters or inches);

Feed-in rate (mm/spindle-rev or in/spindle-rev); and

Final Position (millimeters or inches). The initial velocity is equal to the feed rate, and the final velocity is zero. Note that the initial and final position can be specified directly, or one can be specified directly and the other specified indirectly via a feed distance, or "throw."

The Dwell operation preferably causes the turret slide to remain in a given position for a specific number of spindle revolutions. It is used immediately following a Feed-In operation. The Dwell operation uses the following operator-specified parameter: Duration (spindle revolutions). The dwell position is equal to the final position of the operation which precedes it. The turret-slide velocity is zero throughout a Dwell operation.

The Feed-Out operation is used for cutting operations in which the turret tooling is retracting out of the feedstock, such as when a tap is being unscrewed. The feed-out operation preferably has the following operator-specified parameters:

Feed-out rate (mm/spindle-rev or in/spindle-rev); and

Final Position (millimeters or inches).

The initial position is equal to the final position of the operation which precedes it. The initial velocity is zero, and the final velocity is equal to the feed-out rate. Note that the final position can be specified directly, or it can be specified indirectly via a feed distance, or "throw."

The Turn-Around operation computes the time-optimal trajectory which connects adjacent operations. The Turn-Around operation automatically provides the rapid out/in motions normally employed to get tools into cutting position in minimum time. The turn-around operation preferably has the following (optional) operator-specified parameters:

Minimum "clear" position (millimeters or inches); and

Minimum "clear" period (seconds, or hundredths of a cycle). The initial position and velocity are equal to the final position and velocity of the operation which precedes it. The final position and velocity are equal to the initial position and velocity of the operation which succeeds it.

The optional operator-specified parameters provide a means by which the operator can allow adequate time and clearance for tool index operations, cross-slide operations, etc. The minimum clear position is specified such that, when the turret slide is retracted beyond the minimum clear position, there is no possibility of interference between the turret tooling and any other devices on the screw machine. The clear period is the period for which the turret slide is retracted to or beyond the minimum clear position. The default for the clear position is the minimum possible retract distance, and the default for the clear period is zero.

The Position operation is used to precisely position the turret slide in a specified location for a specified duration. It differs from the Dwell operation in two ways: it includes a pre-defined approach trajectory to the specified position (this trajectory maximizes the positioning accuracy), and its duration is not specified in terms of spindle revolutions. One use of the Position operation is to position the turret slide for a feed-stop operation.

The Position operation preferably uses the following operator-specified parameters:

Final Position (millimeters or inches); and

Duration (seconds, or hundredths of a machine cycle).

The initial position is a function of the Final Position and of the approach trajectory. The final velocity is zero. The initial velocity is a function of the approach trajectory.

The VersaCam trajectory design 80 provides a benefit which is not available using a conventional turret cam. Using a hard cam, there is normally no efficient way to independently and precisely adjust the extension of the tools in the tool turret. The normal practice is to loosen the tool holders and tap the tools with a brass hammer, using trial and error to get within the part tolerance. The VersaCam trajectory design, however, allows the operator to enter a precise tool offset adjustment for a given tool into the VersaCam controller, using the controller's numeric keypad. The trajectory design Subsystem 80 then makes the appropriate offset adjustment to the turret slide trajectory during the period of time in which the given tool is being used.

The Camshaft Monitoring Subsystem 82 provides camshaft state 92 (position, velocity, and acceleration) information to the other VersaCam functional subsystems. In general, all camshaft state variables can be sensed, or else a subset of them can be sensed and the remainder of them estimated by a state observer. To minimize the cost of the sensor system, and because there is mechanical (rotational) noise on the camshaft that is not desirable, it is preferred to directly measure the position of the camshaft, and to use state observer/filter techniques to obtain accurate estimates of camshaft position, velocity, and acceleration.

The camshaft monitoring system thus preferably comprises two primary subsystems: the Camshaft Position Sensor (including its electronic interface), and Camshaft Observer Subsystem.

The Camshaft Position Sensor is a position transducer which measures the angle of the turret camshaft relative to the machine frame. An incremental optical encoder, with a 1024 counts per revolution quadrature output and an index channel, may be used. The encoder may be driven in a 1:1 ratio by the camshaft relative to the machine frame. Associated with the encoder is an electronic circuit which receives the quadrature signal and converts it to a binary count of 4096 counts per revolution. This circuit interfaces to a microprocessor in the VersaCam controller. The electrical power to the encoder, and to its associated electronics, may be supplied by a battery in the event of an AC power failure; this prevents the absolute position information from being lost (which would require a re-registration procedure to be performed).

The Camshaft Observer Subsystem is a software system which processes the signal from the Camshaft Position Sensor, produces a better estimate of camshaft position than can be obtained by the sensor alone, and provides velocity and acceleration information as well. The raw sensor output has several deficiencies: (1) it does not provide the velocity or the acceleration of the camshaft, (2) it contains discretization noise, and (3) the camshaft is subject to backlash to which the turret slide should not respond to (but which the sensor measures).

The camshaft of a screw machine is driven with respect to the spindle via a gear train which exhibits backlash. At certain times, cross-slide return springs may, via the cross-slide cams, suddenly back-drive the camshaft through this backlash region. In such situations the spindle does not undergo any acceleration, thus we do not wish the turret slide to undergo any acceleration. If the turret slide were to track the transformed camshaft acceleration, it could result in a tool being accelerated rapidly into the stock during a cutting operation, possibly breaking a tool or ruining the part being machined.

The Camshaft Observer Subsystem may include a P-I filter which produces pseudo-continuous (as opposed to discretized) acceleration, velocity, and position outputs. The error between the observed position and the measured position is used to force the observed position to track the measured position. The output of the P-I filter is input to a 2nd-order, state-variable, low-pass filter, which further reduces discretization noise.

In addition to reducing discretization noise and providing acceleration and velocity outputs, the Camshaft Observer Subsystem can detect the position errors characteristic of the camshaft backlash phenomenon. To minimize the effect of this phenomenon on the filter output, the gains of both filter stages are changed when backlash is detected. This gain-scheduling algorithm increases the time constant of both filter stages for the duration of the backlash phenomenon, resulting in the observed camshaft position, velocity, and acceleration being largely unaffected by the backlash phenomenon.

The camshaft serves as a mechanical transmission which powers or activates various mechanisms on the screw machine, causing one part to be made during each full revolution of the camshaft. For our purposes, the important attribute of the camshaft is that it controls the machine, it establishes the relationship between the operations of the various devices, and it controls the rate at which the various operations progress. Thus we use the term "machine cycle," or simply "cycle," synonymously with "one full revolution of the camshaft."

The time-based trajectory which is generated by the Turret Slide Trajectory Design Subsystem is computed assuming that the camshaft speed is a known, constant value. In general, however, this is not precisely true (especially when the machine is starting and stopping). Since the turret slide must be precisely synchronized with the other mechanisms that are driven from the camshaft, the turret slide trajectory should be made to conform to the actual camshaft speed. Because a physical cam does precisely synchronize its output drive with the camshaft, regardless of camshaft speed, the subsystem which performs this synchronization function is termed the Cam Simulator Subsystem 84. It preferably has two primary components:

Time-Base to Cycle-Base Conversion Subsystem; and

Cycle-Base to Time-Base Conversion Subsystem.

Since the camshaft angle, rather than time, is the independent variable that controls turret slide position, velocity, etc., the first thing done by the Cam Simulator Subsystem 84 is to convert time-based trajectory parameters to cycle-based parameters. This can be done to each of the segment parameters, the complete set of which completely describes the entire trajectory. In this manner, the entire trajectory can be converted off-line, prior to actual trajectory execution. Alternatively, individual turret-slide states (position, velocity, and acceleration) can be converted as they are used during trajectory execution.

Trajectory parameters with units of time (seconds) are converted to units of "cycles" by dividing by the nominal machine-cycle period (seconds/cycle). Parameters with units of position (meters) do not require conversion. Parameters with units of velocity (meters/second) are converted to units of meters/cycle by multiplying by the nominal cycle period (seconds/cycle). Parameters with units of acceleration (meters/second$^2$) are converted to units of (meters/cycle$^2$) by multiplying by the square of the nominal cycle period (seconds/cycle).

During trajectory execution, the actual camshaft state 92 (position in cycles, velocity in cycles/second, and acceleration in cycles/second$^2$) is used, together with the desired cycle-based turret-slide state 100 (position in meters, velocity in meters/cycle, and acceleration in meters/cycle2), to determine the desired time-based turret-slide state (position in meters, velocity in meters/second, and acceleration in meters/second$^2$). The turret-slide position requires no conversion. To obtain the corrected turret velocity (meters/second), the cycle-based turret velocity (meters/cycle) is multiplied by the actual camshaft velocity (cycles/second). To obtain the corrected turret acceleration (meters/second$^2$), the camshaft velocity and acceleration are combined with the cycle-based turret velocity and acceleration as follows:

$$(\text{meters/second}^2) = (\text{meters/cycle}^2)*(\text{cycles/second})^2 + (\text{meters/cycle})*(\text{cycles/second}^2)$$

The Turret Slide Actuation Subsystem 86 provides a means by which the screw machine turret slide can be made to move in the desired manner. It preferably has two major functional subsystems:

Controlled Actuator; and

Transmission System.

The Controlled Actuator Subsystem is a motor system which can follow motion commands to the appropriate level of accuracy. The Transmission System connects the Controlled Actuator to the screw machine turret slide mechanically, and also provides software functions which describe the relationship between the Controlled Actuator and the turret slide. These functional subsystems are described in greater detail hereinafter.

The Controlled Actuator Subsystem preferably includes all of the functional subsystems necessary to provide a mechanical motion output which tracks a commanded motion input. These functional subsystems include:

Motor;

Motor Feedback System;

Motor Amplifier; and

Feedback Control Law.

A brush-type electric DC servomotor may be chosen for the VersaCam system. Alternative motor types which could be used include brushless DC servomotors, electric stepper motors, and hydraulic motors. The particular motor selected can operate at the voltage levels obtained by simply rectifying and filtering, for example, the 205 VAC, 3-phase power used to operate a typical conventional screw machine; this eliminates the need for a bulky and expensive power transformer or for separate electrical service to the VersaCam system.

In controlling a DC servomotor, useful feedback parameters include: motor position, motor velocity, motor acceleration, motor current, and motor output torque. However, knowing only the motor position and the motor current, it is possible to obtain very good estimates of motor velocity, motor acceleration, and motor output torque which permit near-optimal control of the motor. Thus in order to minimize sensor costs, it is advantageous to directly sense only motor position and motor current.

The motor state feedback system preferably includes the following primary functional subsystems:

Motor Position Feedback Subsystem;

Motor Current Feedback Subsystem; and

Motor State Observer Subsystem.

A motor position sensor may be mounted directly to the motor shaft. One preferred sensor is an incremental optical encoder, with a 1024 counts per revolution quadrature output and an index channel. Associated with the encoder is an electronic circuit which inputs the quadrature signal and converts it to a binary count of 4096 counts per revolution. This circuit interfaces to a microprocessor in the VersaCam controller. The electrical power to the encoder, and to its associated electronics, may be supplied by a battery in the event of an AC power failure; this prevents the absolute position information from being lost (which would require a re-registration procedure to be performed).

Because the particular design selected for the Turret Slide Actuation Subsystem requires that the motor make multiple revolutions in order to move the turret slide through its full range of motion, the once-per-revolution index pulse provided by the motor encoder does not establish an absolute motor position. For this reason, the Transmission System provides a "home position" output when the mechanical transmission is at a particular location. This output enables the Motor Feedback Subsystem to determine the absolute revolution number of the motor. A software component of the Motor Feedback Subsystem converts the encoder count information, the encoder index pulse information, and the Transmission System "home position" information into an absolute motor shaft angle.

Motor current may be sensed by connecting a low-ohmage resistor in series with the motor, and then measuring the voltage drop across this resistor. Alternatively, devices may be used which measure the magnitude of the motor current by measuring the strength of the magnetic field produced by the current.

The basis of the Motor State Observer Subsystem is a dynamic motor simulation, which is based on a mathematical model of the motor. The inputs to the motor simulation may be the motor current and the motor shaft (output) torque. The outputs of the simulation may be motor acceleration, velocity, and position.

Since the current of the physical motor is measured and is thus known, it is used as the current input for the simulated motor. The motor shaft torque is not directly known, and is the remaining input to the simulated motor through which the simulated motor can be controlled.

The position output of the simulated motor is compared to the measured position of the physical motor. The resulting error is used to generate an observed motor shaft torque, via a feedback control law, which is used as the torque input to the simulated motor. The feedback control law forces the position of the simulated motor to track the position of the physical motor. Thus, within the limitations of the accuracy of the mathematical motor model and the bandwidth of the observer feedback loop, the observer acceleration, velocity, and motor shaft torque are also equal to those of the physical motor.

The function of a motor amplifier is to produce a high-power output, which can directly power a motor, as specified by a low-power control input. For the brush-type DC servomotor used in the VersaCam system, the basic amplifier should produce a short-term average voltage across the motor terminals which is specified by a low-power control input.

A four-quadrant PWM (Pulse-Width Modulation) type amplifier may be used on the basis of its good energy efficiency, low heat generation, and compact size. A PWM amplifier rapidly switches the voltage across the motor terminals between the full supply voltage and zero volts. The average voltage is controlled by varying the ratio of the time that the two different voltages are applied.

The preferred amplifier design operates off of a DC voltage supply of approximately 300V. This voltage supply is normally provided by rectifying and filtering the 205 VAC 3-phase power used to operate the screw machine.

In the event of a power failure, the screw machine will not stop immediately (unless it is declutched) but will instead coast to a stop. In order to prevent damage to tooling during this coastdown period, it is desirable for the VersaCam Turret Actuation Subsystem to continue actuating the turret slide in synchronization with the camshaft. This can be made possible by connecting a battery system (preferably 300 V) to the amplifier power inputs. This battery system need only supply the amplifier with current during the brief coastdown period. It can be recharged automatically when AC power is recovered.

The Actuated Motor is caused to track its commanded position, velocity, and acceleration by means of a two-stage feedback control law. The output of the feedback control law is a motor voltage command to the motor amplifier. The inputs to the feedback control law are the outputs of the Motor State Observer Subsystem (observed motor position, velocity, acceleration, and output torque), and the commanded motor state. The two stages of the control law are:

Motor Acceleration Control Law; and
Motor Current Control Law.

The first stage of the feedback control law is a simple state-space control law that is used to calculate the desired acceleration of the motor, given the commanded and observed motor state variables. Then, using a standard mathematical model of the motor, the motor current required to produce the desired motor acceleration is computed algebraically. This desired motor current is used as the input to the Motor Current Control Law.

The Motor Current Control Law is used to force the actual motor current to track the desired motor current. The inputs to this control law are the desired motor current and the measured motor current, the output is the motor voltage command to the motor amplifier. Because of the high bandwidth requirements of the current control system, the current control law is preferably implemented using electronic hardware rather than software.

The Transmission System provides the interface, both mechanical and computational, between the Controlled Actuator and the screw machine turret slide. It comprises three primary functional subsystems:

Transmission Mechanism;
Kinematics Mathematical Relationships; and
Transmission Position Feedback.

The primary function of the Transmission Mechanism is to provide a mechanical transmission between the Controlled Actuator and the screw-machine turret slide. One of the simplest possible mechanism designs would be a direct ball-screw drive between the motor and the turret slide. However, any such direct linear drive system would require extensive modifications to the screw machine in order to provide for the mechanical attachment of the drive system. Thus the turret slide may preferably be actuated via the stock turret-cam follower; that is, the stock turret-cam follower is used as a component of the VersaCam Transmission Mechanism.

Having made the decision to actuate the turret slide via the cam follower, there is a multitude of possible mechanisms which could successfully interface between the Controlled Actuator and the cam follower. Examples of such mechanisms include:

Spiral-shaped rotary cam actuation;
Wedge-shaped linear cam actuation; and
Pinned lever actuation.

The prototype Transmission Mechanism makes use of wedge-shaped linear cam actuation. This mechanism uses a ball-screw to convert the rotary motion of the Controlled Actuator to linear motion of a wedge-shaped linear cam. When the linear cam is fully retracted, the turret slide return spring pushes the turret slide, and thus turret-cam follower, to its minimum position. As the linear cam is extended, its wedge shape pushes the cam follower, and thus the turret slide, toward its maximum position.

A pinned-lever actuation system is another attractive mechanism alternative. This mechanism makes use of a lever on which the roller of the cam follower rides. The lever is pinned at a fixed position on one side of the roller. On the other side of the roller, a ball-screw (which is at approximately a right angle to the lever) may be used to rotate the lever through an appropriate angle about the pinned joint. As a result of the rotation of the lever, the cam follower is moved through its required range of motion.

Pinned-lever actuation has several advantages over wedge-shaped linear cam actuation. First, it makes use of rotary joints only, thus it does not require the expense of a linear guideway. Second, it is easier to seal the mechanism from oil, metal chips, etc. Third, (for the Brown & Sharpe 2G screw machine, at least) it can be packaged into a volume which is less likely to inconvenience people working in the vicinity of the machine.

Rotary cam actuation is, of the various alternatives discussed herein, the mechanism most similar to the normal cam actuation. Using this scheme, a cam, which is preferably of a spiral shape is servo-actuated so as to engage the cam follower. Thus any desired turret slide position can be achieved by rotating the cam to a corresponding angle.

The function of the Kinematics Mathematical Relationships is to compute the relationships between the position, velocity, and acceleration of the screw machine turret and the position, velocity, and acceleration of the Controlled Actuator. Obviously, the mathematical description is dependent upon the type of mechanism.

For a very simple mechanical transmission such as a direct ball-screw drive, the Mathematical Relationships are straightforward: the motor, position, velocity, or acceleration is multiplied by a constant in order to obtain the turret slide position, velocity, or acceleration.

If the turret cam is actuated via the cam-follower, using a non-linear mechanism, the kinematic equations of the VersaCam Transmission Mechanism are quite complex. However, polynomial curve-fitting techniques may be used in order to make the Kinematics Mathematical equations relatively simple. Only the polynomial approximations to the kinematic equations are embedded in the VersaCam system, thus the kinematic equations can be evaluated quickly by a microprocessor in the VersaCam controller.

To obtain polynomial approximations to the kinematic equations, the exact kinematic equation relating turret slide position to Controlled Actuator position is first derived. That equation is then used to generate a set of points (actuator position and turret slide position) which cover the entire range of motion of the system. That set of points is input into polynomial curve-fitting software which generates sets of polynomial coefficients for the equations X=P1(Phi) and Phi=P2(X) (where X represents turret slide position and Phi represents Controlled Actuator shaft angle). The order of polynomials P1 and P2 are chosen to be as small as possible, yet still maintain the maximum curve-fit error to within a specified tolerance.

The equations relating turret velocity and acceleration with actuator velocity and acceleration can be obtained by differentiating the kinematic equations relating the positions of the turret slide and actuator. Now having accurate polynomial representations of the positional relationships, one may differentiate the polynomial approximations, rather than laboriously differentiating the exact equations.

Because the VersaCam trajectory is initially specified in terms of turret slide positions, velocities, and accelerations, the Kinematics Mathematical Relationships Subsystem is used to compute the corresponding Controlled Actuator positions, velocities, and accelerations (which are then used as inputs to the Controlled Actuator). Similarly, when the actual turret slide position is displayed to the operator, the kinematics software is used to calculate the turret slide position based upon the measured motor position.

To provide a means by which the VersaCam controller can determine the absolute position of the VersaCam motor (the motor encoder itself cannot indicate the motor revolution number), a position-sensing device has been incorporated into the Transmission System. The device selected may be a mechanical limit switch, configured so as to be "on" when the motor has rotated beyond a given point, and so as to be "off" if the motor has not rotated beyond that point. Thus information is provided which specifies the direction of motor rotation required in order to reach the trip point. The trip point is preferably chosen to lie approximately midway between two adjacent motor index pulses. Thus, after finding the trip point, the motor can proceed to rotate to an adjacent index pulse, which then provides a precise absolute motor position.

The Operator Interface Subsystem 88 provides the operator with the appropriate control over, and feedback from, preferably all functional subsystems of the VersaCam system. In general, each functional subsystem may require input from the operator, and it may have to prompt the operator in order to obtain such input. In addition, the operator will require feedback from various VersaCam functional subsystems in order to verify that they are programmed as desired, and that they are operating properly.

If provided a large number of independent operator I/O devices for the VersaCam system, one could dedicate one input device and one display device to each functional subsystem. The I/O software for each functional subsystem would then be straightforward: it could format the output display, and it could write to the display at any time.

As a practical matter, one embodiment of the VersaCam system operates with one primary display device and one primary input device at a time (although there may also be some secondary devices such as control switches and indicator lights). The primary input device may be a keypad or a computer keyboard (although it could easily be a touch-screen or other such device). The primary display may be a device that supports alpha-numeric display, such as a small alpha-numeric LCD display or a full-size computer monitor. Thus the primary input device and the primary display may be shared by many functional subsystems.

The complexity of sharing the operator I/O devices can be separated from the VersaCam functional subsystems by using the concept of "virtual" I/O devices. Although restricted to a single pair of physical I/O devices, one can implement as many virtual I/O devices as desired by sharing the physical devices in a well-defined way, such as by separating the display screen into different regions or by allowing only one virtual I/O device at a time to use the physical I/O devices. Regardless of how the virtual devices are implemented, one can provide dedicated virtual I/O devices to all of the functional subsystems.

The scheme chosen to provide virtual I/O device support is a "windowing" system. In general, each virtual display can be shown in a "window" on the physical display device. (A given window may or may not be visible on the screen at any given time.) Operator input is then routed to the functional subsystem which "owns" the window in which the visible cursor resides (although certain keys may be dedicated to specific functional subsystems). The software subsystem which implements the windowing capability can support different types of display and input devices without requiring changes to the functional subsystem software.

On a large display screen, it is possible for many or all windows to be shown on the screen simultaneously. On a small screen, it may be possible to show only the active (input) window. A relatively large window may support menu-driven operation. Alternatively, a single-cell window may be created for each operator input parameter, resulting in a user interface very similar to a spreadsheet.

To illustrate the flexibility afforded by this approach, consider the following example. It is expected that the Turret Slide Trajectory Design Subsystem 80 will operate on both the VersaCam controller, using a keypad and a small (4×20 characters) alphanumeric display, and on a personal computer using a standard keyboard and a full-size display. However, the majority of the trajectory design software can run on either platform with no modification whatsoever. The functional subsystem I/O software can be left unchanged using only a 4×20 section of the PC screen for the display; only the windowing support software need be changed to support the different hardware platforms. Even if it is desired to make optimal use of each type of display, the functional subsystem I/O software can query the windowing support software as to the size of available windows and then implement the optimal interface for that window size, with there still being no modifications required to the remainder of the functional subsystem software.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A machine tool apparatus comprising:
an operator interface adapted to allow an operator to specify parameters for a turn-around operation and a feed-in operation, said turn-around operation for computing a trajectory which connects adjacent operations, said feed-in operation for a cutting operation in which a turret tooling is advanced into a feedstock; and
a tool slide adapted to move in said trajectory, said trajectory including said turn-around operation and said feed-in operation; and
wherein said feed-in operation uses initial position, feed-in rate, and final position as parameters.

2. The machine tool apparatus of claim 1 wherein said operator interface is adapted to enable an operator to program said apparatus by a keyboard at said apparatus.

3. The machine tool apparatus of claim 1 wherein said operator interface is adapted to enable an operator to program said apparatus by a touchscreen at said apparatus.

4. The machine tool apparatus of claim 1 wherein said operator interface includes an output display.

5. The machine tool apparatus of claim 1 wherein said feed-in operation and said turn-around operation are performed within a machine cycle.

6. A machine tool apparatus comprising:

an operator interface adapted to allow an operator to specify parameters for a turn-around operation and a dwell operation, said turn-around operation for computing a trajectory which connects adjacent operations, said dwell operation for causing a tool slide to remain in a predetermined position for a specific number of spindle revolutions; and said tool slide adapted to move in said trajectory, said trajectory including said turn-around operation and said dwell operation; and wherein said dwell operation uses duration as a parameter.

7. The machine tool apparatus of claim 6 wherein said operator interface is adapted to enable an operator to program said apparatus by a keyboard at said apparatus.

8. The machine tool apparatus of claim 6 wherein said operator interface is adapted to enable an operator to program said apparatus by a touchscreen at said apparatus.

9. The machine tool apparatus of claim 6 wherein said operator interface includes an output display.

10. The machine tool apparatus of claim 6 wherein said dwell operation and said turn-around operation are performed within a machine cycle.

11. A machine tool apparatus comprising:

an operator interface adapted to allow an operator to specify parameters for a turn-around operation and a feed-out operation, said turn-around operation for computing a trajectory which connects adjacent operations, said feed-out operation for a cutting operation in which a turret tooling is retracted out of a feedstock; and a tool slide adapted to move in said trajectory, said trajectory including said turn-around operation and said feed-out operation; and wherein said feed-out operation uses feed-out rate and final position as parameters.

12. The machine tool apparatus of claim 11 wherein said operator interface is adapted to enable an operator to program said apparatus by a keyboard at said apparatus.

13. The machine tool apparatus of claim 11 wherein said operator interface is adapted to enable an operator to program said apparatus by a touchscreen at said apparatus.

14. The machine tool apparatus of claim 11 wherein said operator interface includes an output display.

15. The machine tool apparatus of claim 11 wherein said feed-out operation and said turn-around operation are performed within a machine cycle.

16. A machine tool apparatus comprising:

an operator interface adapted to allow an operator to specify parameters for a turn-around operation, said turn-around operation for computing a trajectory which connects adjacent operations; and a tool slide adapted to move in said trajectory, said trajectory including said turn-around operation;

wherein said turn-around operation uses minimum clear position and minimum clear period as parameters.

17. The machine tool apparatus of claim 16 wherein said operator interface is adapted to enable an operator to program said apparatus by a keyboard at said apparatus.

18. The machine tool apparatus of claim 16 wherein said operator interface is adapted to enable an operator to program said apparatus by a touchscreen at said apparatus.

19. The machine tool apparatus of claim 16 wherein said operator interface includes an output display.

20. A machine tool apparatus comprising:

an operator interface adapted to allow an operator to specify parameters for a turn-around operation and a position operation, said turn-around operation for computing a trajectory which connects adjacent operations, said position operation for positioning a tool slide in a location for a specified duration; and a tool slide adapted to move in said trajectory, said trajectory including said turn-around operation and said position operation; and wherein said position operation uses final position and duration as parameters.

21. The machine tool apparatus of claim 20 wherein said operator interface is adapted to enable an operator to program said apparatus by a keyboard at said apparatus.

22. The machine tool apparatus of claim 20 wherein said operator interface is adapted to enable an operator to program said apparatus by a touchscreen at said apparatus.

23. The machine tool apparatus of claim 20 wherein said operator interface includes an output display.

24. The machine tool apparatus of claim 20 wherein said turn-around operation and said position operation are performed within a machine cycle.

* * * * *

UNITED STATES PATENT AND TRADEMARK OFFICE
CERTIFICATE OF CORRECTION

PATENT NO. : 6,662,074 B2 Page 1 of 1
DATED : December 9, 2003
INVENTOR(S) : Dennis R. Pugh et al.

It is certified that error appears in the above-identified patent and that said Letters Patent is hereby corrected as shown below:

<u>Title page,</u>
After *Assistant Examiner*, please insert -- [74] *Attorney, Agent, or Firm* - Standley & Gilcrest LLP --

Signed and Sealed this

Sixth Day of April, 2004

JON W. DUDAS
*Acting Director of the United States Patent and Trademark Office*